US012726643B1

(12) United States Patent
He et al.

(10) Patent No.: US 12,726,643 B1
(45) Date of Patent: Sep. 1, 2026

(54) IMAGE ENCODING METHOD AND IMAGE ENCODING DEVICE

(71) Applicant: Realtek Semiconductor Corp., HsinChu (TW)

(72) Inventors: QingXi He, Suzhou City (CN); Wujun Chen, Suzhou City (CN); Weimin Zeng, San Jose, CA (US); Chi-Wang Chai, Santa Clara, CA (US)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 19/245,440

(22) Filed: Jun. 23, 2025

(51) Int. Cl.
*H04N 7/12* (2006.01)
*H04N 19/105* (2014.01)
*H04N 19/172* (2014.01)
*H04N 19/426* (2014.01)

(52) U.S. Cl.
CPC ......... *H04N 19/426* (2014.11); *H04N 19/105* (2014.11); *H04N 19/172* (2014.11)

(58) Field of Classification Search
CPC .................................................... H04N 19/426
See application file for complete search history.

(56) References Cited

U.S. PATENT DOCUMENTS

2006/0159349 A1 7/2006 Chiang
2009/0304255 A1 12/2009 Hagiwara
2014/0010299 A1 1/2014 Huang
2023/0058283 A1* 2/2023 Kang .................. H04N 19/159
2026/0059097 A1* 2/2026 Piao ..................... H04N 19/105
2026/0129221 A1* 5/2026 Yang .................... H04N 19/423

* cited by examiner

*Primary Examiner* — Y Lee
(74) *Attorney, Agent, or Firm* — Winston Hsu

(57) ABSTRACT

An image encoding method, comprising: (a) storing first frame data of a first frame to a first region of the first storage region; (b) reading the first frame data, and using frame data stored in the second storage region as first reference frame data to encode the first frame data to generate first reconstruction data of a first reconstruction frame; (c) before the first frame data is completely read from the first region, writing the first reconstruction data to a second region of the first storage region; and (d) deleting the frame data in the second storage region, writing second frame data of a second frame to a first region of the second storage region, encoding the second frame data using the first reconstruction data as second reference data to generate second reconstruction data, and then writing the second reconstruction data to a second region of the second storage region.

16 Claims, 8 Drawing Sheets

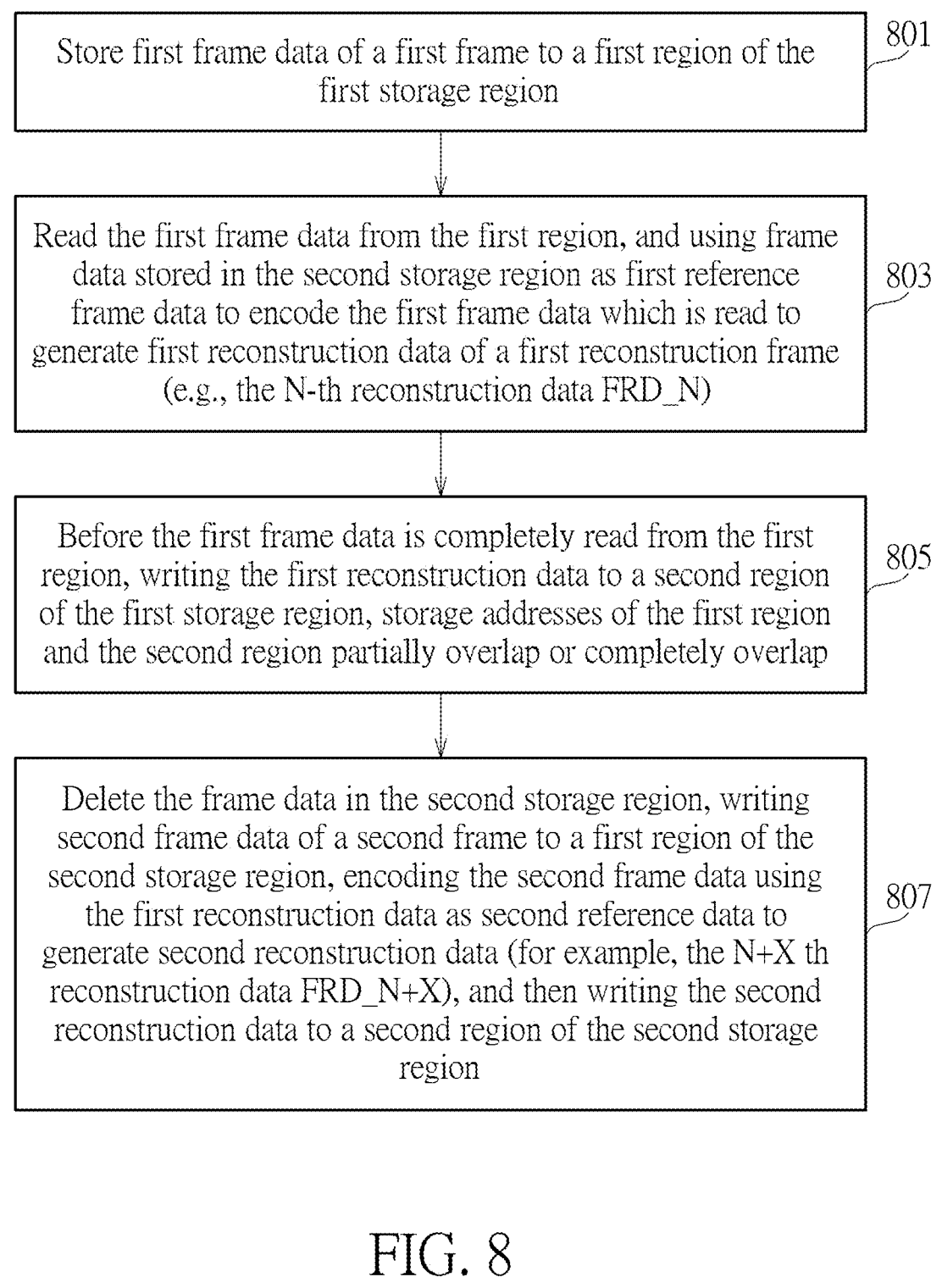

Store first frame data of a first frame to a first region of the first storage region — 801

Read the first frame data from the first region, and using frame data stored in the second storage region as first reference frame data to encode the first frame data which is read to generate first reconstruction data of a first reconstruction frame (e.g., the N-th reconstruction data FRD_N) — 803

Before the first frame data is completely read from the first region, writing the first reconstruction data to a second region of the first storage region, storage addresses of the first region and the second region partially overlap or completely overlap — 805

Delete the frame data in the second storage region, writing second frame data of a second frame to a first region of the second storage region, encoding the second frame data using the first reconstruction data as second reference data to generate second reconstruction data (for example, the N+X th reconstruction data FRD_N+X), and then writing the second reconstruction data to a second region of the second storage region — 807

FIG. 8

IMAGE ENCODING METHOD AND IMAGE ENCODING DEVICE

BACKGROUND OF THE INVENTION

1. Field of the Invention

The present invention relates to an image encoding method and an image encoding device, and particularly relates to an image encoding method and an image encoding device which can decrease the number of storage components for storing reference frames.

2. Description of the Prior Art

In conventional image encoding techniques, multiple storage components are usually required to temporarily store reconstruction frames as reference frames for subsequent frame encoding. For example, multiple buffers are used to temporarily store reference frames of subsequent frames. In addition, conventional image encoding techniques also require a storage component to store the frame data to be encoded. However, such architecture will greatly increase the number of storage components, thereby increasing the hardware area and cost of the storage components. As electronic devices become increasingly smaller and hardware cost control becomes increasingly stringent, such architecture needs to be improved.

SUMMARY OF THE INVENTION

One objective of the present invention is to provide an image encoding method, which can reduce a number of the storage components required during image encoding.

Another objective of the present invention is to provide an image encoding device, which can reduce a number of the storage components required during image encoding.

One embodiment of the present invention discloses an image encoding method, applied to an image encoding device comprising a first storage region and a second storage region, the image encoding method comprising: (a) storing first frame data of a first frame to a first region of the first storage region; (b) reading the first frame data from the first region, and using frame data stored in the second storage region as first reference frame data to encode the first frame data which is read to generate first reconstruction data of a first reconstruction frame; (c) before the first frame data is completely read from the first region, writing the first reconstruction data to a second region of the first storage region, storage addresses of the first region and the second region partially overlap or completely overlap; and (d) deleting the frame data in the second storage region, writing second frame data of a second frame to a first region of the second storage region, encoding the second frame data using the first reconstruction data as second reference data to generate second reconstruction data, and then writing the second reconstruction data to a second region of the second storage region.

Another embodiment of the present invention discloses an image device comprising a first storage device, a second storage device and a control circuit. The control circuit is configured to perform an image encoding method comprising: (a) storing first frame data of a first frame to a first region of the first storage region; (b) reading the first frame data from the first region, and using frame data stored in the second storage region as first reference frame data to encode the first frame data which is read to generate first reconstruction data of a first reconstruction frame; (c) before the first frame data is completely read from the first region, writing the first reconstruction data to a second region of the first storage region, storage addresses of the first region and the second region partially overlap or completely overlap; and (d) deleting the frame data in the second storage region, writing second frame data of a second frame to a first region of the second storage region, encoding the second frame data using the first reconstruction data as second reference data to generate second reconstruction data, and then writing the second reconstruction data to a second region of the second storage region.

In view of above-mentioned embodiment, the non-coded frame and the reconstruction frame generated after coding can share a single storage region. Thus, no additional storage component is required to store the reconstruction frame of the current frame during coding, thereby reducing the number of required storage components.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a schematic diagram illustrating an image encoding method according to one embodiment of the present invention.

DETAILED DESCRIPTION

In the following descriptions, several embodiments are provided to explain the concept of the present application. The term "first", "second", "third" in following descriptions are only for the purpose of distinguishing different one components, and do not mean the sequence of the components. For example, a first device and a second device only mean these devices can have the same structure but are different devices.

Figure 1:
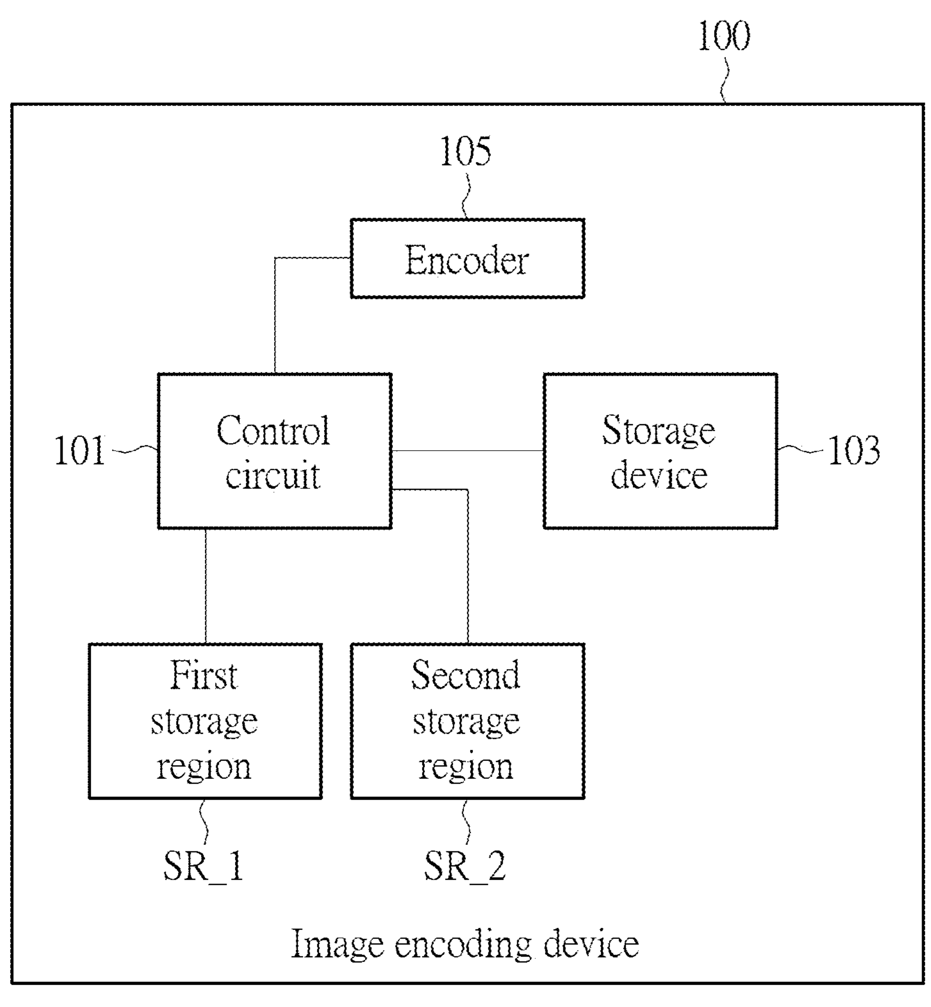
FIG. 1 is a block diagram illustrating an image encoding device according to one embodiment of the present invention.

FIG. 1 is a block diagram illustrating an image encoding device according to one embodiment of the present invention. As shown in FIG. 1, the image encoding device 100 comprises a control circuit 101, a storage device 103, an encoder 105, a first storage region SR_1, and a second storage region SR_2. The storage space (i.e., the amount of data that can be stored) of the first storage region SR_1 is larger than or equal to the storage space of the second storage region SR_2. When the storage space of the first storage region SR_1 and the storage space of the second storage region SR_2 are the same, the storage space may be equal to the storage space required for the data size of a frame plus the storage space required for the delay time when performing the access action. In the following embodiments, the storage space of the first storage region SR_1 is larger than the storage space of the second storage region SR_2. Please also note that FIG. 1 is only used for illustration, and the number, position and connection relationship between the components of the image encoding device 100 are not limited to the embodiment of FIG. 1.

The image encoding device 100 may be comprised in any electronic device, such as a notebook computer, a mobile phone or a tablet computer. The control circuit 101 is configured to read the program in the storage device 103 to control the actions of the encoder 105, the first storage region SR_1 and the second storage region SR_2 to execute an image encoding method. The actions of such image encoding method will be described in detail below. The control circuit 101 may be divided into more circuits or devices. For example, the control circuit 101 can be divided into an encoding control circuit and a storage control circuit. The encoding control circuit is configured to control the encoder 105, and the storage control circuit is configured to control the first storage region SR_1 and the second storage region SR_2. Such variations should also fall within the scope of the present invention. The first storage region SR_1 and the second storage region SR_2 may be different regions in the same storage component or may be two independent storage components. For example, the first storage region SR_1 and the second storage region SR_2 may be different regions in the same memory, or be different buffers.

Figure 2:
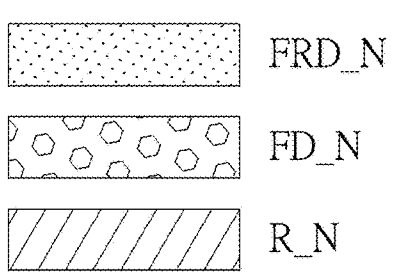
FIG. 2 to FIG. 5 are schematic diagrams illustrating image encoding methods according to different embodiments of the present invention.
Figure 2:
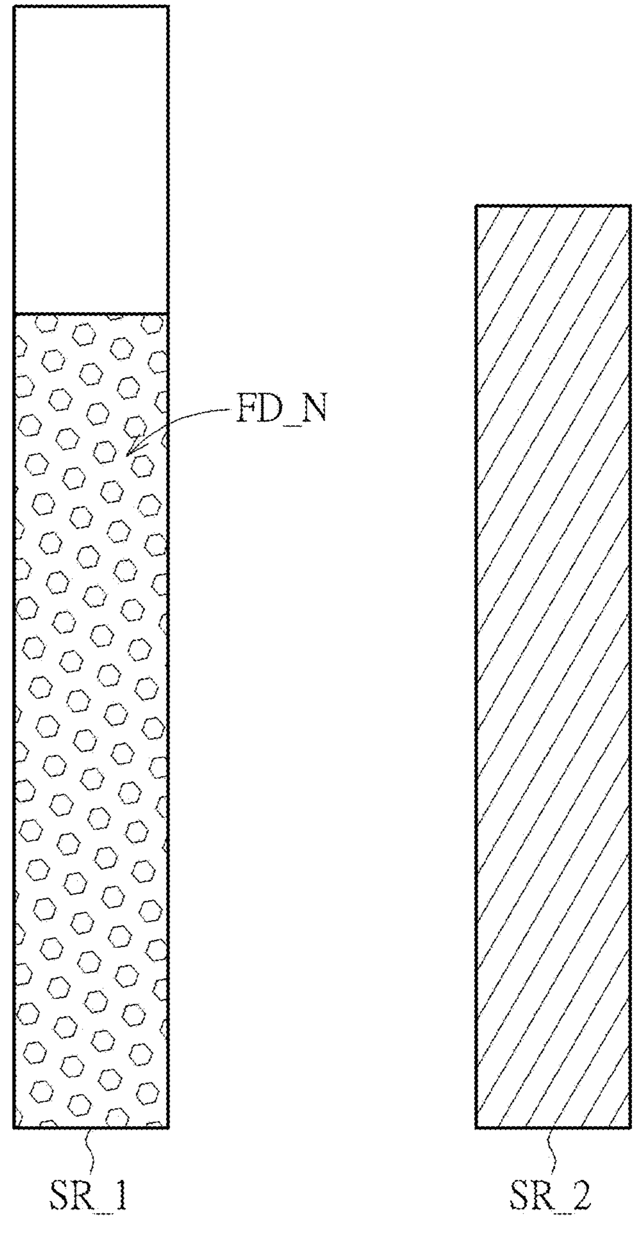
Figure 3:
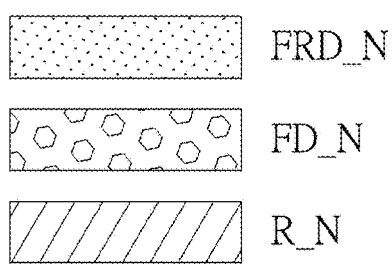
Figure 3:
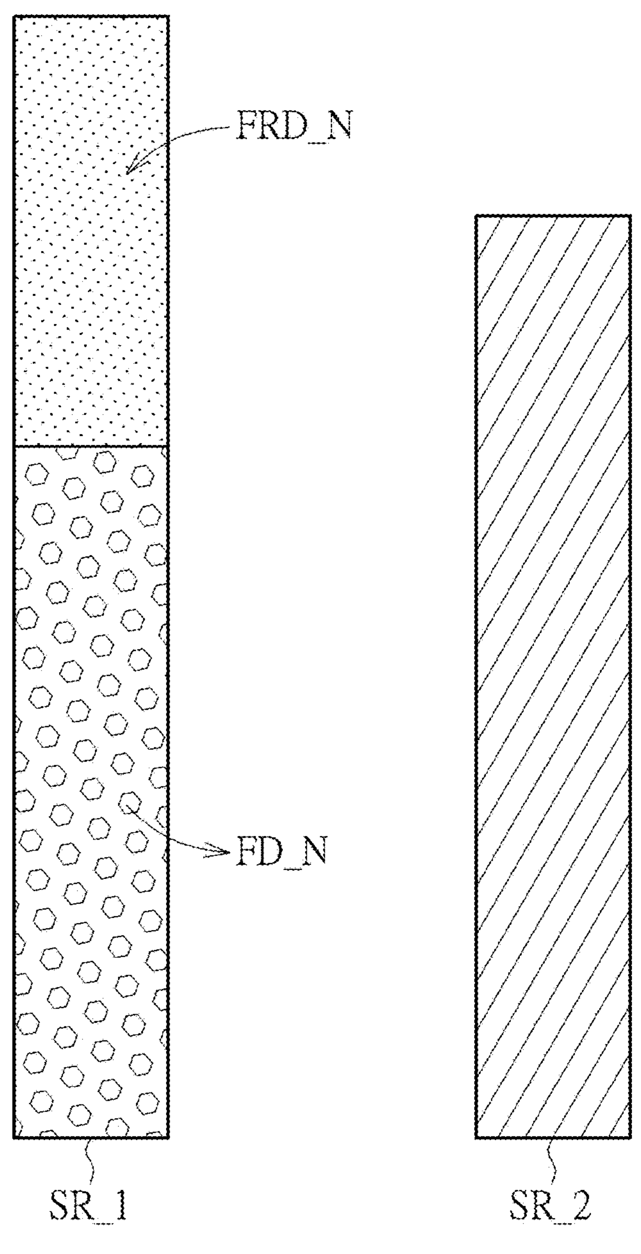

FIG. 2 to FIG. 5 are schematic diagrams illustrating image encoding methods according to different embodiments of the present invention. As shown in FIG. 2, after receiving the N-th frame, the image encoding device 100 stores the N-th frame data FD_N of the N-th frame to the first region of the first storage region SR_1. At the same time, the second storage region SR_2 may store the reference frame R_N which is referenced when encoding the N-th frame. In one embodiment, the N-th frame and the frames of the subsequent embodiments are frames that comply with the AV1 (AOMedia Video 1) encoding standard, but is not limited. The present invention can be used with any encoder that uses reference frames. In FIG. 3, the encoder 105 reads the N-th frame data FD_N stored in the first storage region SR_1 for encoding to generate the N-th reconstruction data FRD_N of the N-th reconstruction frame. In one embodiment, the encoder 105 uses the frame data (i.e., the reference frame R_N) stored in the second storage region SR_2 as reference frame data when encoding the N-th frame data FD_N.

Figure 4:
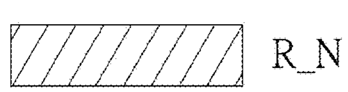
Figure 4:
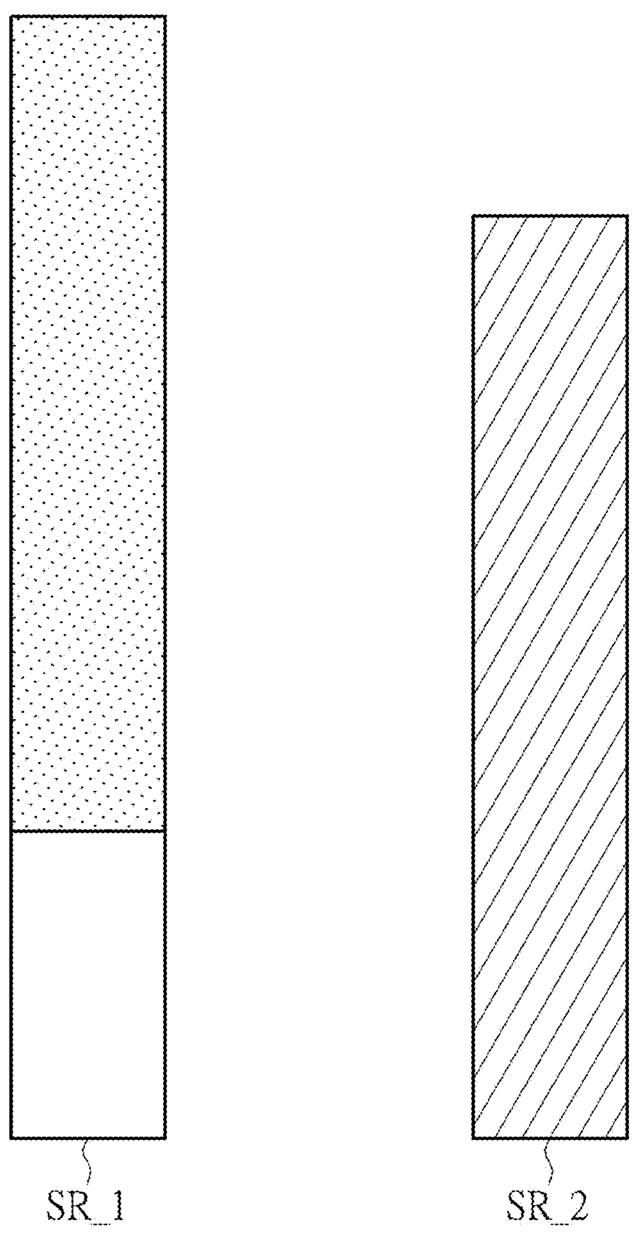
Figure 5:
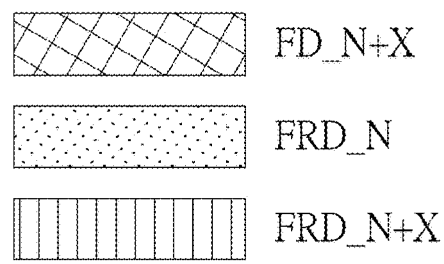
Figure 5:
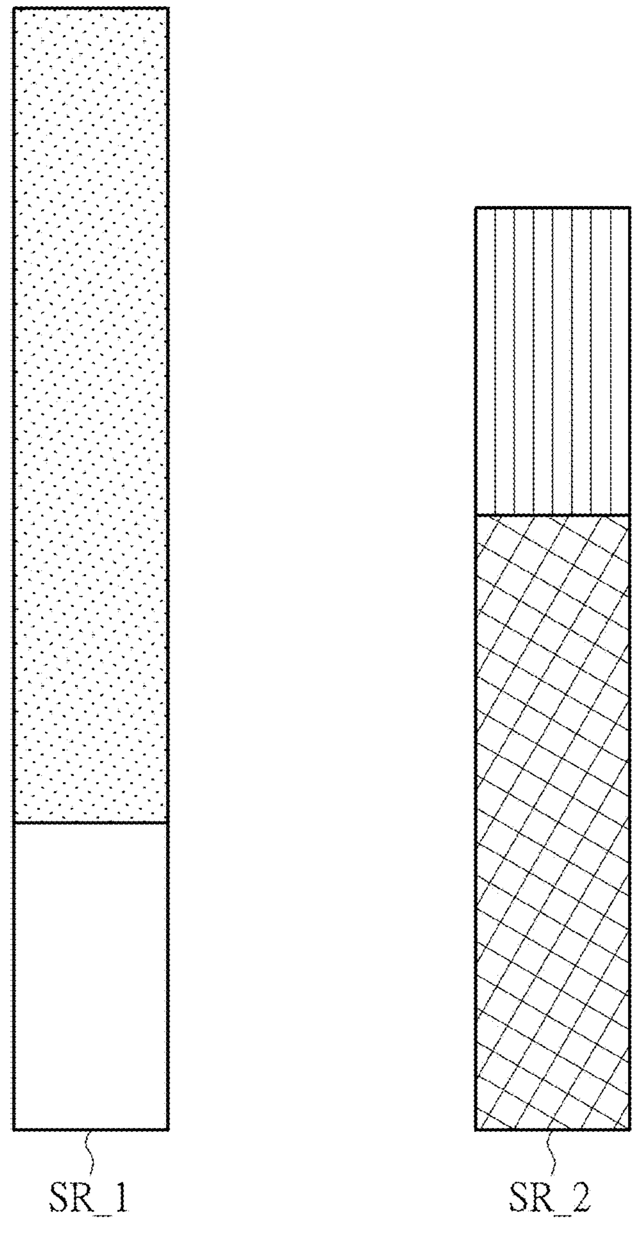

In addition, in FIG. 3, while the encoder 105 is reading the N-th frame data FD_N, that is, before the N-th frame data FD_N is completely read, the encoder 105 starts to write the N-th reconstruction data FRD_N to a second region of the first storage region SR_1. The relationship between the first region and the second region will be described in detail below. In this embodiment, the read N-th frame data FD_N is deleted from the first storage region SR_1 to release the storage space of the first storage region SR_1. In the example of FIG. 4, the N-th reconstruction data FRD_N has been completely written into the first storage region SR_1, that is, the N-th reconstruction frame has been completely written into the first storage region SR_1. In the example of FIG. 5, the original reference frame R_N will be deleted, and the N+X th frame data FD_N+X of the subsequent N+X th frame will be written into the first region of the second storage region SR_2. The N+X th frame data FD_N+X will be encoded using the N-th reconstruction data FRD_N as the reference frame data to generate the N+X th reconstruction data FRD_N+X, and then the N+X th reconstruction data FRD_N+X will be written into a second region in the second storage region SR_2. X in the N+X th frame is a positive integer. In detail, the N+1 th frame is the next frame of the N-th frame, the N+2 th frame is the next frame of the N+1 th frame, and so on.

In the actions of FIG. 3 and FIG. 4, the first storage region SR_1 stores the frame data to be encoded and the reconstruction data (i.e., the first storage region SR_1 is served as a shared storage region), and the second storage region SR_2 stores the reference frame data (i.e., the second storage region SR_2 is served as a reference storage region). In the action of FIG. 5, the second storage region SR_2 stores the frame data to be encoded and the reconstruction data (i.e., the second storage region SR_2 is served as a shared storage region), and the first storage region SR_1 stores the reference frame data (i.e., the first storage region SR_1 is served as a reference storage region). That is, compared with FIG. 2 to FIG. 4, the functions of the first storage region SR_1 and the second storage region SR_2 in FIG. 5 are interchanged. In other words, different storage regions can be set to have different functions according to requirements. Thereby, the frame data to be encoded and the reconstruction data generated by encoding can share the same storage region, thus can reduce the number of required storage regions.

Subsequent frames can also be processed according to the afore-mentioned steps. For example, when the image encoding device 100 receives the next frame and intends to encode it, the steps in FIG. 2 to FIG. 5 may be executed again. The actions in this example are the same as those in the steps of FIG. 2 to FIG. 5 above, thus descriptions thereof are omitted for brevity here.

Figure 6:
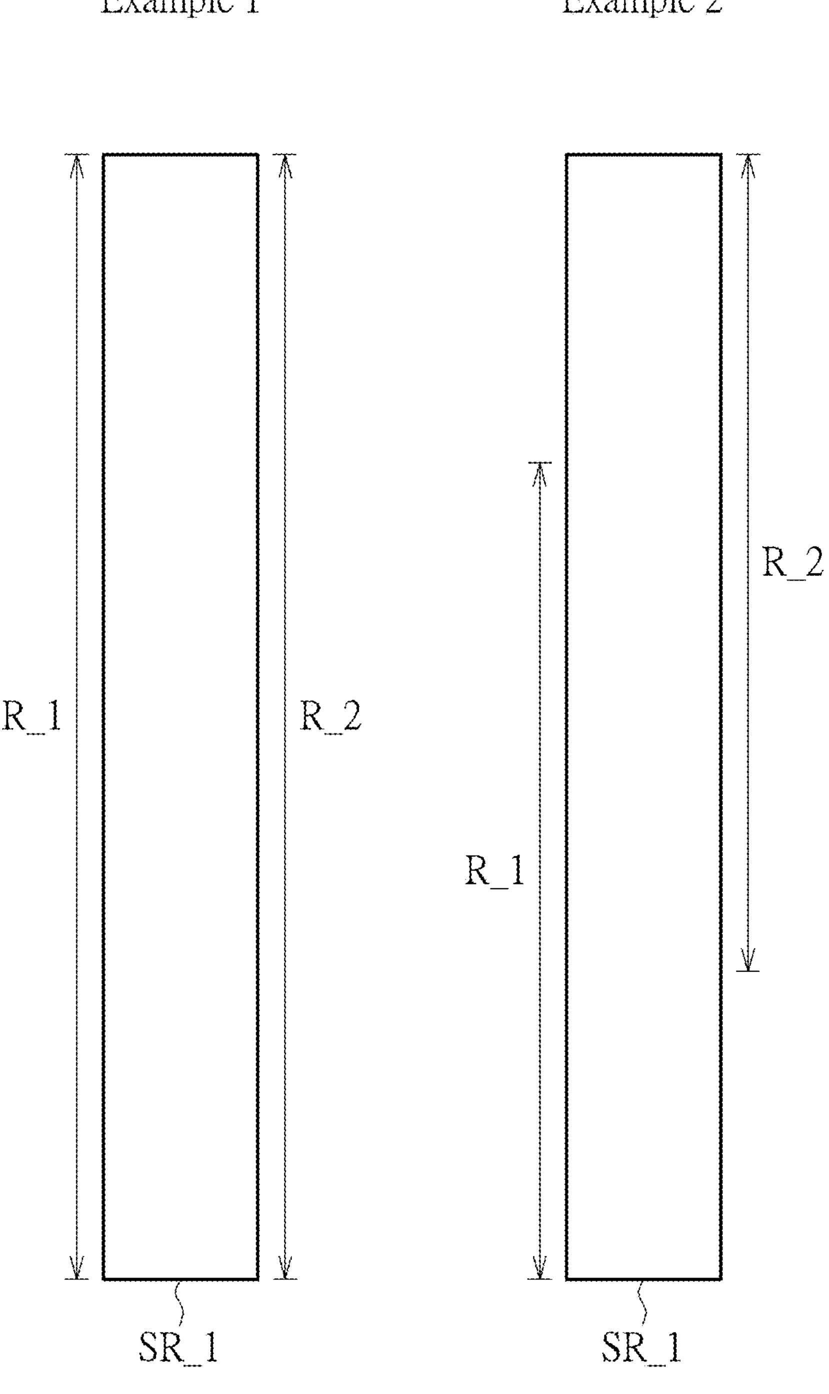
FIG. 6 is a schematic diagram illustrating a first region and a second region of the first storage region, according to different embodiments of the present invention.

As mentioned above, the N-th frame data FD_N is stored in the first region of the first storage region SR_1, and the N-th reconstruction data FRD_N is stored in the second region of the first storage region SR_1. The first region and the second region may be arranged in different ways. FIG. 6 is a schematic diagram illustrating a first region and a second region of the first storage region, according to different embodiments of the present invention. Example 1 can be used when the first storage region SR_1 and other storage regions have the same size, while Example 2 can be used when the first storage region SR_1 has more storage space. Other storage regions may also adopt the same architecture as the example shown in FIG. 6. In Example 1 of FIG. 6, the first region R_1 and the second region R_2 respectively use the entire area of the first storage region SR_1. In this case, the storage addresses of the first region R_1 and the second region R_2 completely overlap. Moreover, in Example 1, a first starting address of the first region R_1 in the first storage region SR_1 is the same as a second starting address of the second region R_2 in the first storage region SR_1. For example, the N-th frame data FD_N and the N-th reconstruction data FRD_N are both stored starting from the first storage address of the first storage region SR_1. In Example 2, the first region R_1 and the second region R_2 respectively use a portion of the first storage region SR_1. The embodiments of FIG. 2 to FIG. 5 use the architecture of Example 2. In this case, the storage addresses of the first region R_1 and the second region R_2 partially overlap. In addition, in Example 2, a first starting address of the first region R_1 in the first storage region SR_1 is subsequent to a second starting address of the second region R_2 in the first storage region SR_1. For example, the N-th frame data FD_N is stored starting from the 50th storage address of the first storage region SR_1, and the N-th reconstruction data FRD_N is stored starting from the first storage address of the first storage region SR_1.

The advantage of Example 2 is that the non-overlapping area of the first region R_1 and the second region R_2 can be used as a buffer for the action of reading the N-th frame data FD_N and the action of writing the N-th reconstruction data FRD_N. As described above, in the example of FIG. 3, the N-th frame data FD_N is deleted after being read, and the N-th reconstruction data FRD_N is written. Therefore, if the reading and deleting of the N-th frame data FD_N is too slow to release the storage space in time, the writing of the N-th reconstruction data FRD_N to be written into the same storage address may fail. However, if the non-overlapping area of the first region R_1 and the second region R_2 is used as a buffer, then even if the action of reading and deleting the N-th frame data FD_N is slow, the action of writing the N-th reconstruction data FRD_N will not be affected.

Figure 7:
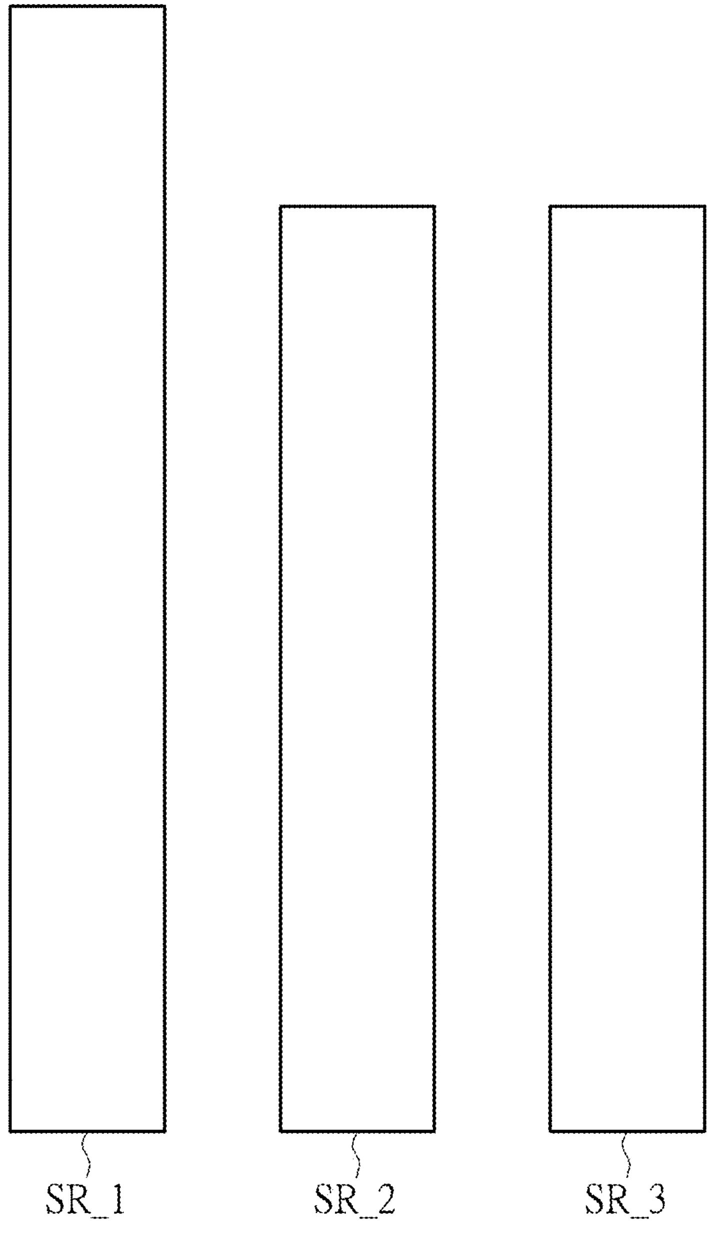
FIG. 7 is a schematic diagram illustrating that the number of reference storage regions is two or more than two, according to one embodiment of the present invention.

The reference storage region comprised in the image encoding device 100 is not limited to only one. FIG. 7 is a schematic diagram illustrating that the number of reference storage regions is two or more than two, according to one embodiment of the present invention. As shown in FIG. 7, in addition to the first storage region SR_1 and the second storage region SR_2, a third storage region SR_3 is also comprised. In the example of FIG. 7, the second storage region SR_2 and the third storage region SR_3 are used as reference storage regions and the first storage region R_1 is used as a shared storage region. The control circuit 101 may select a first reference frame in the second storage region SR_2 or a second reference frame in the third storage region SR_3 as a reference frame when encoding the frame. In one embodiment, a flag is used to mark the second storage region SR_2 and the third storage region SR_3 to select which reference frame to use.

The mechanism of FIG. 7 can be used in a variety of situations. In one embodiment, when encoding the N-th frame, the second storage region SR_2 and the third storage region SR_3 respectively store reference frames encoded using the previous N−1 th frame and the N−2 th frame. If only the N−1 th frame is referenced, the reference frame of the third storage region SR_3 may be deleted. Then, the N-th frame is encoded according to the reference frame in the second storage region SR_2, and the generated N-th reconstruction frame is copied from the first storage region SR_1 to the third storage region SR_3 and then deleted from the first storage region SR_1. In another embodiment, if the second storage region SR_2 is damaged, the N-th frame may be encoded according to the reference frame in the third storage region SR_3 and then its reference frame may be deleted. The generated N-th reconstruction frame may be copied from the first storage region SR_1 to the third storage region SR_3 and then deleted from the first storage region SR_1.

The number of the aforementioned storage regions can also be changed dynamically. For example, in the embodiment of FIG. 7, a first storage region SR_1, a second storage region SR_2, and a third storage region SR_3 are used. In this case, there may be other storage regions that are not used for image encoding or storage regions that are not enabled. At least one of these storage regions can be set or enabled according to different requirements, so that it performs the image encoding method together with the second storage region SR_2, the third storage region SR_3 and the first storage region SR_1. In this case, the storage space of all storage regions may be the same and equal to the storage space required for the data size of a frame plus the storage space required for the delay time when performing the access action.

In view of the above-mentioned embodiments, a video encoding method can be obtained, which is applied a video encoding device. The video encoding device comprises a first storage region and a second storage region, such as the video encoding device 100 in FIG. 1.

FIG. 8 is a schematic diagram illustrating an image encoding method according to one embodiment of the present invention, which comprises the following steps:

Step 801

Store first frame data of a first frame (e.g., N-th frame data FD_N) to a first region of the first storage region Step 803

Read the first frame data from the first region, and using frame data stored in the second storage region as first reference frame data to encode the first frame data which is read to generate first reconstruction data of a first reconstruction frame (e.g., the N-th reconstruction data FRD_N).

Step 805

Before the first frame data is completely read from the first region, writing the first reconstruction data to a second region of the first storage region, storage addresses of the first region and the second region partially overlap or completely overlap Step 807

Delete the frame data in the second storage region, writing second frame data of a second frame (for example, the N+X th frame data FD_N+X) to a first region of the second storage region, encoding the second frame data using the first reconstruction data as second reference data to generate second reconstruction data (for example, the N+X th reconstruction data FRD_N+X), and then writing the second reconstruction data to a second region of the second storage region The aforementioned embodiments can be used in any situation where image encoding is required. For example, an electronic device comprising an image encoding device may receive an image stream from an image source (e.g., a video website) and decodes the image stream. The image encoding device may then encode the decoded image to generate an image that can be displayed by the electronic device. However, the present invention is not limited to use in such examples.

In view of above-mentioned embodiments, the non-coded frame and the reconstruction frame generated after coding can share a single storage region. Thus, no additional storage component is required to store the reconstruction frame of the current frame during coding, thereby reducing the number of required storage components.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image encoding method, applied to an image encoding device comprising a first storage region and a second storage region, the image encoding method comprising:

(a) storing first frame data of a first frame to a first region of the first storage region;

(b) reading the first frame data from the first region, and using frame data stored in the second storage region as first reference frame data to encode the first frame data which is read to generate first reconstruction data of a first reconstruction frame;

(c) before the first frame data is completely read from the first region, writing the first reconstruction data to a second region of the first storage region, storage addresses of the first region and the second region partially overlap or completely overlap; and (d) deleting the frame data in the second storage region, writing second frame data of a second frame to a first region of the second storage region, encoding the second frame data using the first reconstruction data as second reference data to generate second reconstruction data, and then writing the second reconstruction data to a second region of the second storage region.

2. The image encoding method of claim 1, wherein a storage space of the first storage region is larger than or equal to a storage space of the second storage region.

3. The image encoding method of claim 1, wherein a first starting address of the first region in the first storage region is after a second starting address of the second region in the first storage region.

4. The image encoding method of claim 1, wherein a first starting address of the first region in the first storage region is identical with a second starting address of the second region in the first storage region.

5. The image encoding method of claim 1, wherein the second frame is a X-th frame after the first frame, wherein X is a positive integer.

6. The image encoding method of claim 1, wherein the image encoding device further comprises a third storage region, and the image encoding method further comprises:

selecting a first reference frame in the second storage region or a second reference frame in the third storage region as a reference frame for encoding the first frame.

7. The image encoding method of claim 1, wherein the first storage region and the second storage region are two independent storage components.

8. The image encoding method of claim 1, wherein the first frame complies with an encoding standard of AV1 (AOMedia Video 1).

9. An image device, comprising:

a first storage region;

a second storage region;

a control circuit, configured to perform an image encoding method comprising:

(a) storing first frame data of a first frame to a first region of the first storage region;

(b) reading the first frame data from the first region, and using frame data stored in the second storage region as first reference frame data to encode the first frame data which is read to generate first reconstruction data of a first reconstruction frame;

(c) before the first frame data is completely read from the first region, writing the first reconstruction data to a second region of the first storage region, storage addresses of the first region and the second region partially overlap or completely overlap; and (d) deleting the frame data in the second storage region, writing second frame data of a second frame to a first region of the second storage region, encoding the second frame data using the first reconstruction data as second reference data to generate second reconstruction data, and then writing the second reconstruction data to a second region of the second storage region.

10. The image device of claim 9, wherein a storage space of the first storage region is larger than or equal to a storage space of the second storage region.

11. The image device of claim 9, wherein a first starting address of the first region in the first storage region is after a second starting address of the second region in the first storage region.

12. The image device of claim 9, wherein a first starting address of the first region in the first storage region is identical with a second starting address of the second region in the first storage region.

13. The image device of claim 9, wherein the second frame is a X-th frame after the first frame, wherein X is a positive integer.

14. The image device of claim 9, wherein the image encoding device further comprises a third storage region, and the image encoding method further comprises:

selecting a first reference frame in the second storage region or a second reference frame in the third storage region as a reference frame for encoding the first frame.

15. The image device of claim 9, wherein the first storage region and the second storage region are two independent storage components.

16. The image device of claim 9, wherein the first frame complies with an encoding standard of AV1 (AOMedia Video 1).

* * * * *